United States Patent [19]

Katori et al.

[11] Patent Number: 5,715,067

[45] Date of Patent: Feb. 3, 1998

[54] DIGITAL IMAGE FORMING APPARATUS AND METHOD WITH VARIABLE DUTY RATIO

[75] Inventors: Kentaro Katori, Toyokawa; Masahiro Kouzaki, Gamagori; Yoshinobu Hada, Aichi-ken; Yukihiko Okuno; Katsuyuki Hirata, both of Toyokawa, all of Japan

[73] Assignee: Minolta Co., Ltd., Osaka, Japan

[21] Appl. No.: 610,231

[22] Filed: Mar. 4, 1996

[30] Foreign Application Priority Data

Mar. 7, 1995 [JP] Japan .................................. 7-047403

[51] Int. Cl.$^6$ .................. H04N 1/29; H04N 1/40; G01D 15/14; G01D 9/42
[52] U.S. Cl. .................. 358/298; 358/300; 358/448; 358/458; 347/143; 347/144; 347/253
[58] Field of Search .................. 358/298, 296, 358/300, 448, 453, 456, 458, 459, 463, 465, 466, 519, 521, 532, 538; 347/131, 143, 144, 251–254, 237, 247; 399/177, 181; 382/199, 266

[56] References Cited

U.S. PATENT DOCUMENTS

| | | | |
|---|---|---|---|
| 4,074,319 | 2/1978 | Goldschmidt et al. | 358/230 |
| 4,679,057 | 7/1987 | Hamada | 358/298 X |
| 5,381,221 | 1/1995 | Mizaguchi et al. | 358/448 X |
| 5,420,614 | 5/1995 | Fukui et al. | 358/298 X |
| 5,477,317 | 12/1995 | Edmunds et al. | 358/448 X |
| 5,479,175 | 12/1995 | Cianciosi et al. | 347/252 |
| 5,485,289 | 1/1996 | Curry | 358/448 |
| 5,581,292 | 12/1996 | Cianciosi et al. | 347/131 |

*Primary Examiner*—Eric Frahm
*Attorney, Agent, or Firm*—Burns, Doane, Swecker & Mathis, LLP

[57] ABSTRACT

In a digital image forming apparatus, when a latent image is formed on a photoconductor, a light from a light source is emitted in a period of a duty ratio while modulated according to image data, and the latent image is developed and transferred onto a sheet of paper. The duty ratio, defined as a ratio of a light-emitting time of a light exposing the photoconductor to a period for exposing a dot, is changed in the same document according to dot information on the document such as an edge signal. In the modulation of the optical intensity, the light emission onto the photoconductor is performed with a duty ratio which may be set for each dot. Image portions formed with different duty ratios may exist at the same time in a reproduced image. For example, an edge portion in a document is reproduced at the duty ratio of 100% while a non-edge portion is reproduced at the duty ratio less than 100%.

16 Claims, 8 Drawing Sheets

DIGITAL IMAGE FORMING APPARATUS AND METHOD WITH VARIABLE DUTY RATIO

BACKGROUND OF THE INVENTION

1. Field of the Invention

The present invention relates to a digital image forming apparatus such as a digital copying machine.

2. Description of the Prior Art

In a digital image forming apparatus, a laser beam is modulated to form an electrostatic latent image on a photoconductor. A laser intensity modulation technique is one modulation techniques for modulating a laser beam, and it is superior in both gradation and resolution because modulation is performed in the unit of a pixel.

However, a problem of the laser intensity modulation technique is that a noisy image is liable to be produced due to noises such as pitch noises in a quantity of laser light and irregular driving of the laser. Another problem is that reproducibility at a high-lighted portion is liable to become worse. These problems can be reduced by decreasing a duty ratio of laser beam emitting time less than 100%. That is, when exposure is performed on a pixel, an optical intensity of the laser beam is modulated according to image data while the duty ratio is set at, for example, 80% to emit the laser beam intermittently. Then, granular property of toners developed on the latent image is improved, so that the image quality is improved and gradation characteristic (at half-tone levels) is also improved. However, when the duty ratio is less than 100%, it is a problem that substantial resolution is deteriorated due to vertical lines appearing in the whole image as in pulse width modulation technique.

SUMMARY OF THE INVENTION

An object of the present invention is to provide an image forming apparatus which can modulate an intensity of laser beam without deteriorating substantial resolution.

In a digital image forming apparatus according to the invention, the duty ratio is changed in the same document according to dot information on the document. The duty ratio is defined as a ratio of a light-emitting time of a light exposing the photoconductor to a period for exposing a dot. When an image is formed, a light from a light source is emitted in a period of the duty ratio while modulated according to image data so as to form a latent image on a photoconductor, and the latent image is developed and transferred onto a sheet of paper. In the modulation of the optical intensity, the duty ratio is used according to dot information or the light emission is performed with a duty ratio which may be set for each dot. Thus, image portions formed with different duty ratios may exist at the same time in the image. For example, the dot information is edge information. An edge portion in a document is reproduced at a duty ratio of 100%, while a non-edge portion is reproduced at a duty ratio less than 100%, say 75%.

An advantage of the present invention is that different duty ratios can be set for the same document in the intensity modulation technique.

Another advantage of the present invention is that an image can be reproduced at edge portions with good resolution and at non-edge portions with good granularity and good gradation.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
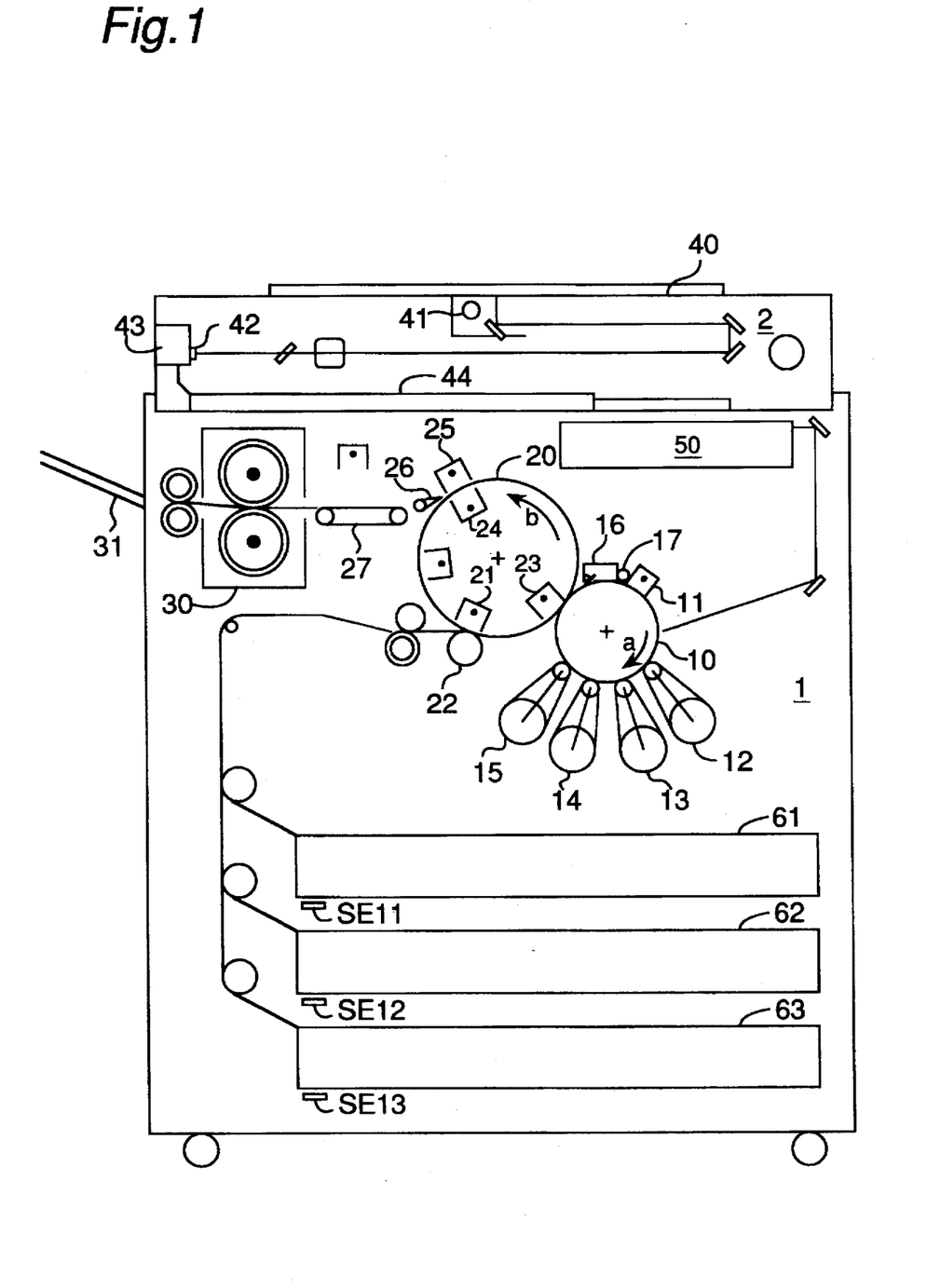
FIG. 1 is a schematic sectional view of a copying machine.

Referring now to the drawings, wherein like reference characters designate like or corresponding parts throughout the several views, FIG. 1 shows a digital full color copying machine schematically. The digital copying machine comprises an image reader 2 for reading a document image and a printer 1 for reproducing the document image.

In the image reader 2, a scanner 41 scans over a document put on a platen 40 while exposing the document. Then, a light reflected from the document is detected with an optical section 43 including a CCD sensor 42. The detected light is converted by photoelectric conversion to electric signals of red, green and blue for each pixel, and they are sent to an electrical signal processor 44 (refer to FIG. 2) as analog data of reflectance.

In the printer 1, a photoconductor drum 10 is provided to be rotated along a direction denoted with an arrow "a", and a transfer drum 20 is also provided near the photoconductor drum 10 to be rotated along a direction denoted with an arrow "b". An eraser lamp 17, a sensitizing charger 11, development units 12, 13, 14 and 15 of four colors, a transfer charger 23, and a cleaning unit 16 for cleaning remaining toners are located around the photoconductor drum 10 successively. An image is formed with a laser beam by a print head unit 50 on the photoconductor drum 10 just after the drum 10 has been sensitized. On the other hand, a charger 21 for absorbing a paper, a roller 22 for absorbing the paper, a transfer charger 23, chargers 24 and 25 for separating the paper and a claw 26 for separating the paper are located around the transfer drum 20 successively.

In the print head unit 50, as will be explained later, the electric signals received from the CCD sensor 42 are digitalized and converted to density data, and gradation correction or gamma correction is performed on the density data according to image reproduction characteristics of the photoconductor and the toners, and the like. Then, the data are converted again to analog data as exposure data. Then, a laser is driven according to the exposure data to expose the rotating photoconductor drum 10. Before the exposure, the photoconductor drum 10 is irradiated by the eraser lamp 17 and sensitized uniformly by the charger 11. When the photoconductor drum 10 is exposed by a laser beam, a latent image of the document image is formed thereon. The development units 12–15 have two-component toners consisting of toners and carriers, and they are arranged opposed to the photoconductor drum 10. Then, the latent image is developed by one of the development units 12–15 to form a visual toner image on the latent image.

On the other hand, three paper cassettes 61, 62 and 63 are provided in the printer 1. The size of papers in the cassettes 61, 62 and 63 is detected by sensors SE11, SE12, SE13. A paper feed by one of the cassettes 61–63 is carried onto the transfer drum 20 in synchronization with an absorption position thereon, and it is absorbed on a film electrostatically with the absorption roller 22 and the absorption charger 21. The image developed on the photoconductor drum 10 is transferred by the transfer charger 23 onto the paper absorbed on the transfer drum 20.

The above-mentioned process of image reading, latent image forming, development and transfer is repeated four times for a full color image (or necessary times). Then, the paper is separated from the transfer drum 20 by the chargers 24, 25 and the claw 26 and carried by a carrier 27 to the fixing unit 30. Then, the toner image is fixed and discharged onto the tray 31.

Figure 2:
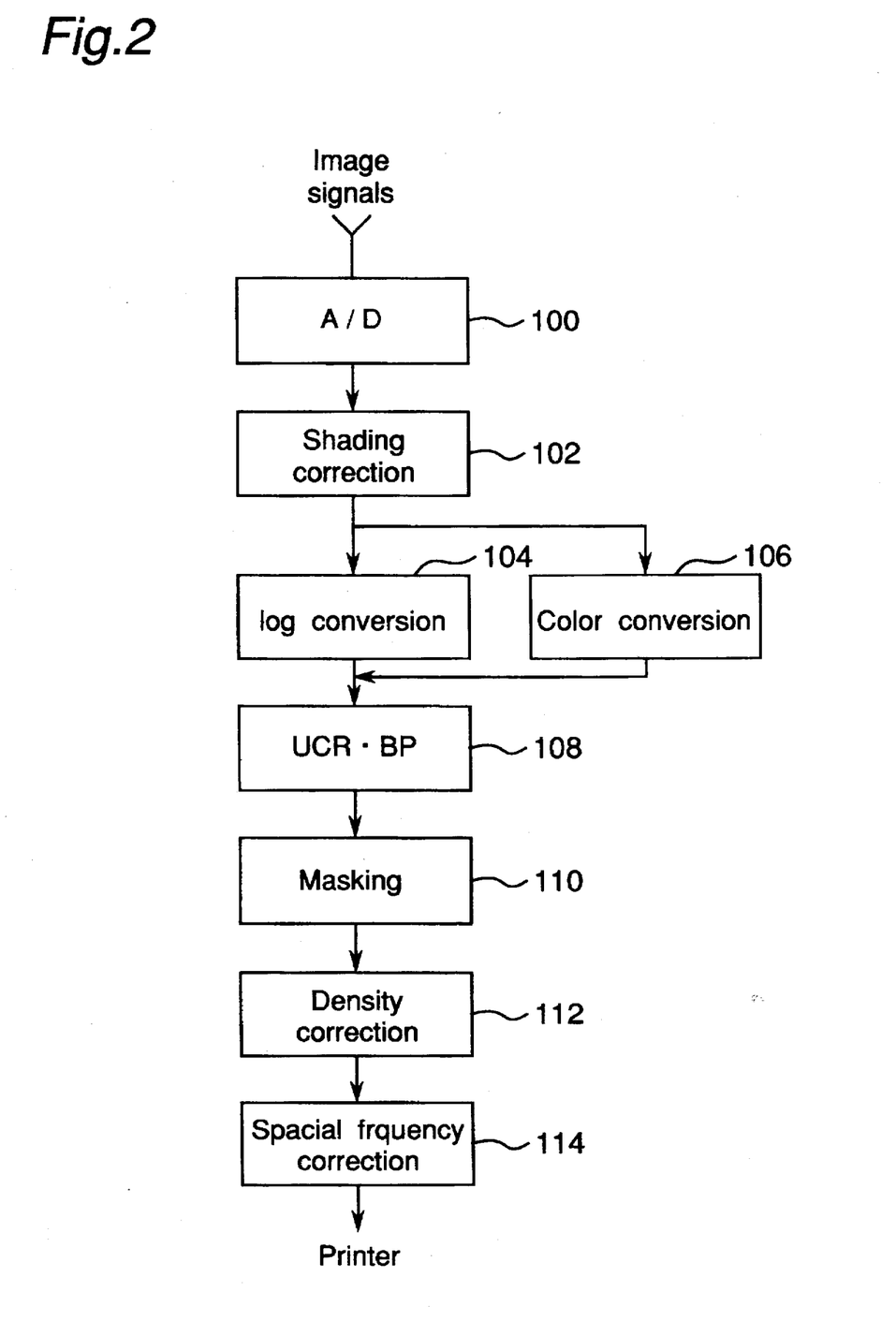
FIG. 2 is a block diagram of an image signal processor.

FIG. 2 is a block diagram of an image signal processor. Image processing from the CCD sensor 42 through the image signal processor 44 to a printer controller is explained with reference to FIG. 2. The CCD sensor 42 has been adjusted on an offset and a gain thereof. The image signals of reflected light of red, green and blue from the CCD sensor 42 is converted by the analog-to-digital converter 100 to multi-level digital values, which is subjected to shading correction by the shading correction circuit 102. Then, the corrected digital values are converted to density data by a log converter 104, while they are also converted to color coordinates of value (V), hue (H) and chroma (C) by the color conversion processor 106. Next, a UCR/BP processing circuit 108 obtains a common portion of the three data of red, green and blue as black data and decreases the three data by the common portion. Then, the masking circuit 110 converts the data of red, green and blue to data of cyan, magenta, yellow and black. A density correction circuit 112 multiplies the data of cyan, magenta, yellow and black with prescribed coefficients in order to correct the density data or to reduce a difference from ideal characteristic by the color correction. Finally, a spacial frequency correction circuit 114 performs smoothing and the like according to features of the image, and sends the data after these processings as print data to the printer 1.

Figure 3:
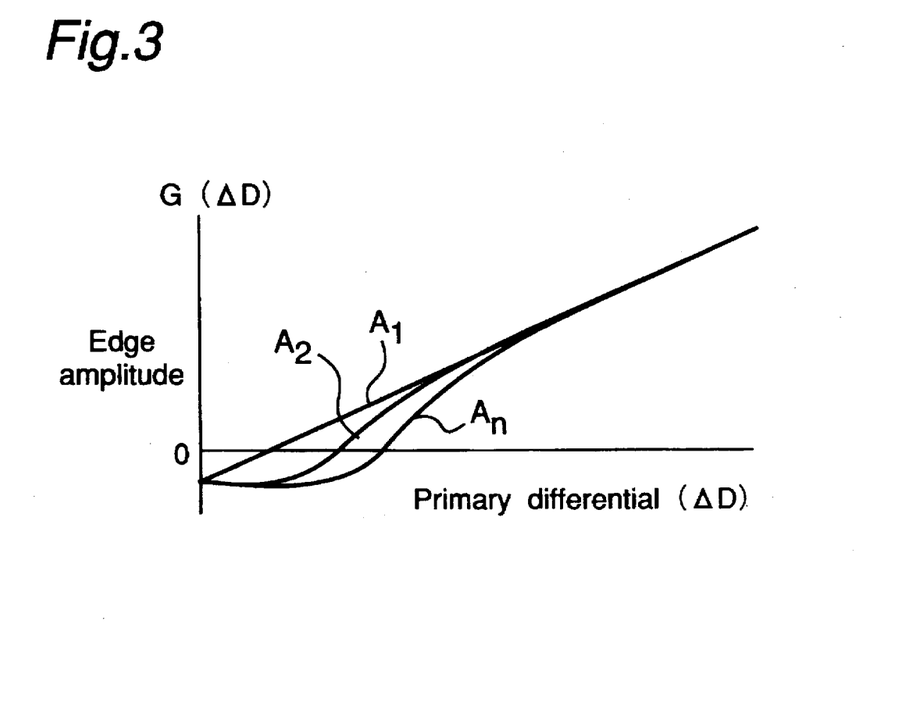
FIG. 3 is a graph of edge emphasis.

Next, filtering in the spacial frequency correction circuit 114 is explained. A primary differential filter and a Laplacian filter are used. FIG. 3 shows a relation of edge amplitude $G(\Delta D)$ to a primary differential data $\Delta D$. A negative portion of the edge amplitude means a half tone area while a positive portion thereof means an edge amplitude. FIG. 3 shows an example of three lines $A_1, A_2$ and $A_n$, wherein $A_n$ represents a function $G_n(\Delta D)$ along the n-th main scan line along the subscan direction. When a primary differential data $\Delta D$ is obtained on a pixel in the n-th main scan line along the subscan direction, an edge amplitude on the pixel is determined from the function $G_n(\Delta D)$. Functions $G_1(\Delta D)$, $G_2(\Delta D), \ldots, G_n(\Delta D)$ are stored as tables preliminarily in the spacial frequency correction circuit 114. When the edge amplitude data $G_n(\Delta D)$ is negative, a smoothing filter such as an averaging filter or a median filter is selected for smoothing. The smoothing may also be performed with a moving average filter.

Figure 6:
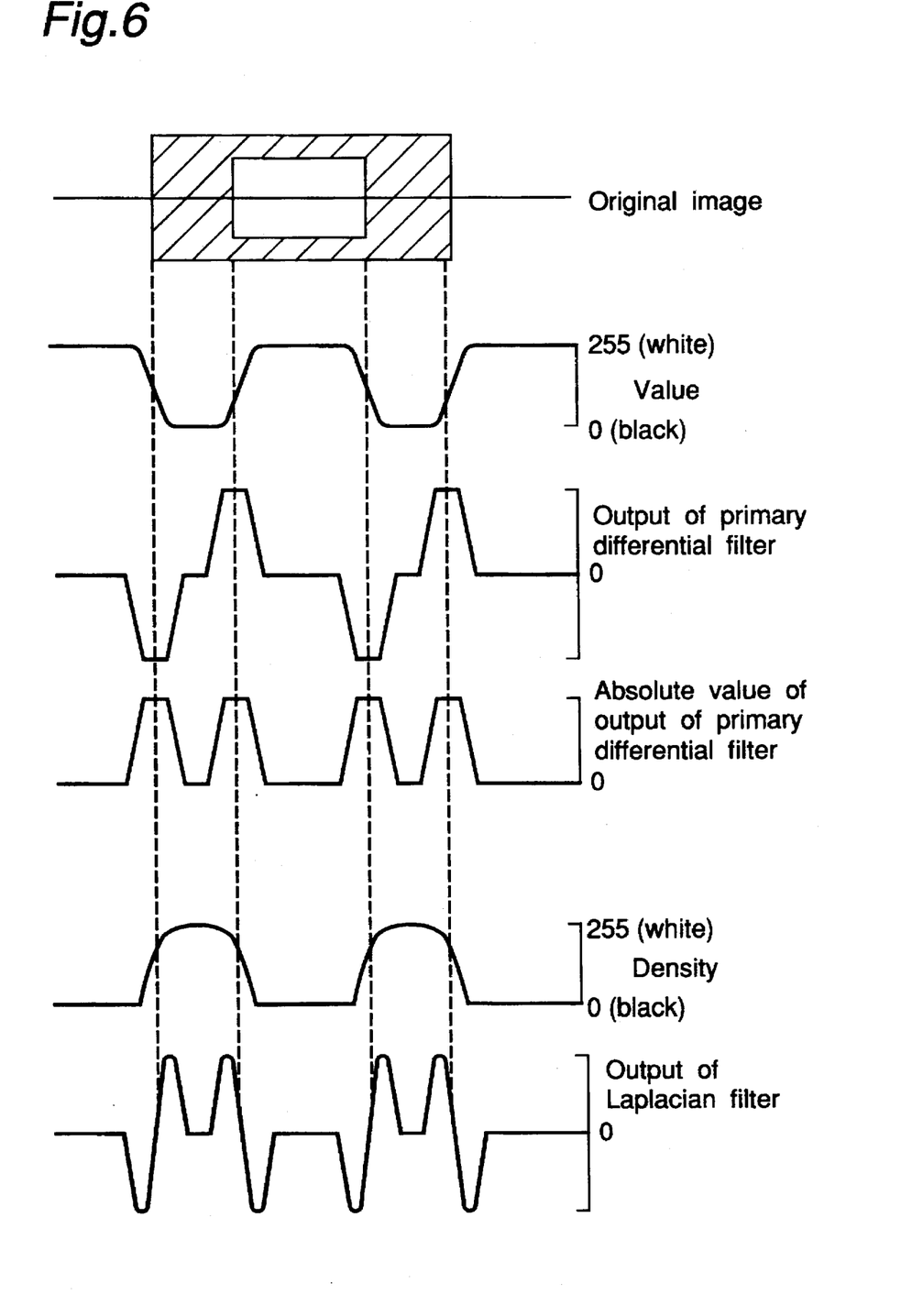
FIG. 6 is a diagram of various signals at an edge.

In FIG. 3, if the primary differential $\Delta D$ becomes larger than a threshold value and the edge amplitude G becomes positive, the edge amplitude G represents an edge component of an image, so that an edge signal explained later is set at "H" level. As the primary differential $\Delta D$ increases, $G(\Delta D)$ increases. As shown in FIG. 6 later, this component usually becomes dull with reference to the original image.

Figure 4:
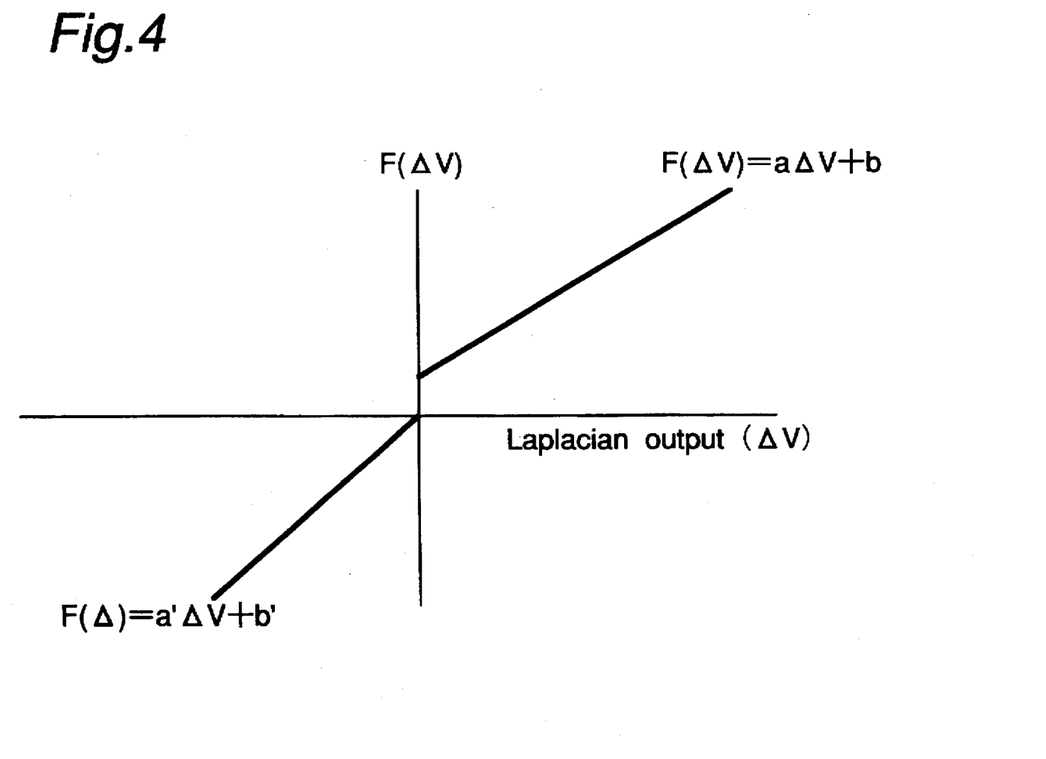
FIG. 4 is a graph of MTF correction function.

FIG. 4 shows an MTF correction function $F(\Delta V)$, wherein $\Delta V$ designates an output of the Laplacian filter on value signal V obtained by the color converter processing circuit 106.

$$F(\Delta V)=a\cdot\Delta V+b, \text{ (if } \Delta V>0) \text{ and}$$
$$F(\Delta V)=a'\cdot\Delta V+b, \text{ (if } \Delta V<0) \tag{1}$$

That is, different MTF correction functions are used according as the output $\Delta V$ is positive or negative. Then, data around an image at an edge is emphasized, and data around a background is reduced. Thus, an edge of an image can be conserved more or emphasized.

Figure 5:
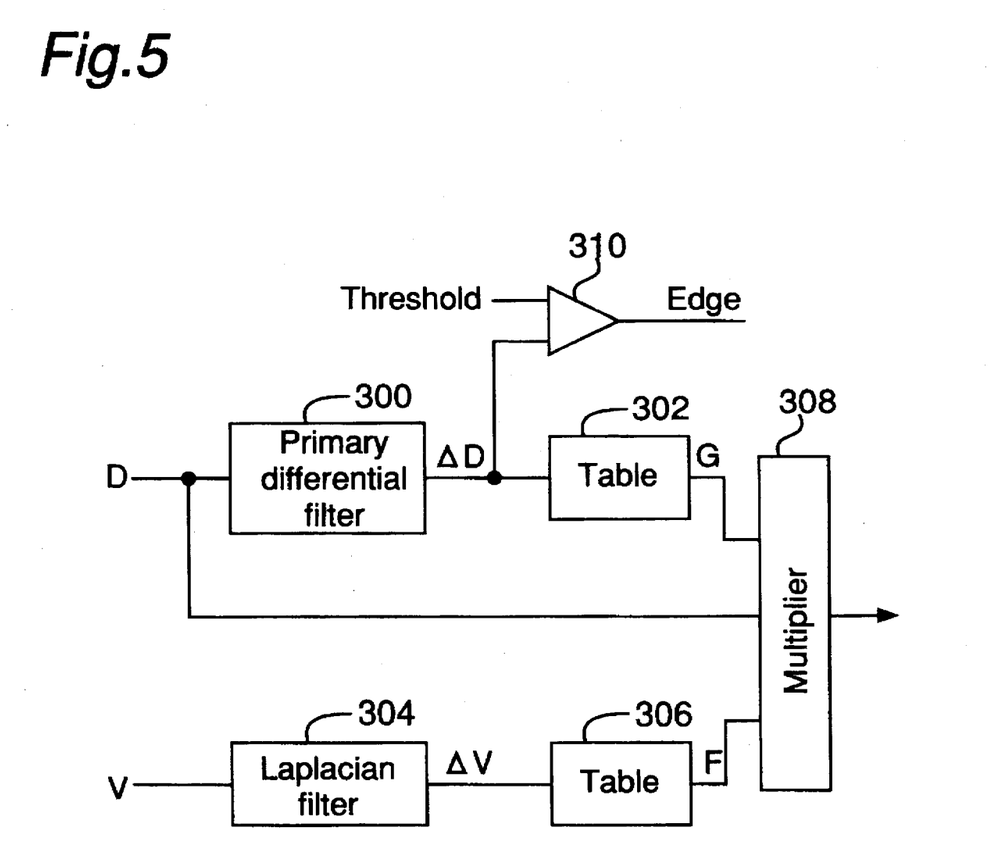
FIG. 5 is a block diagram of a part of a spacial frequency correction circuit.

FIG. 5 is a block diagram of a part of the spacial frequency correction circuit 114. An image signal D from the density correction circuit 112 is differentiated by a primary differential filter 300 to output a primary differential $\Delta D$. Then, the differential $\Delta D$ is supplied to a first table 302 to output an edge amplitude $G(\Delta D)$. On the other hand, the value V from the color conversion circuit 106 is differentiated by a Laplacian filter 304, and a second differential $\Delta V$ is sent to a second table 306 which outputs a correction function $F(\Delta V)$. The image signal D, the edge amplitude $G(\Delta D)$ and the correction function $F(\Delta V)$ are multiplied with each other by a multiplier 308 according to Eq. (2) to output a corrected image signal DD.

$$DD=D\cdot(F(\Delta V)\cdot G(\Delta D)). \tag{2}$$

However, if the calculated image value DD is negative, DD is set as zero. Further, the output $\Delta D$ of the primary differential filter 300 is compared by a comparator 310 with a threshold value. When the output $\Delta D$ of the primary differential filter 300 is larger than the threshold value, the pixel is regarded to exist at an edge, and an edge signal Edge is set at "H" level. The edge signal is sent to the printer controller 206 (FIG. 7) to select the duty ratio.

FIG. 6 shows the value signal V when an original image shown at the top is read in a line along a main scan direction, an output (edge amplitude) of the primary differential filter on the value signal, its absolute value, distribution of density D, and an output of the Laplacian filter. As shown in the value signal V, four edges are found along the line, but the edge amplitude or the output of the primary differential filter becomes dull if compared with the original image. Primary and secondary differentials thereof are also displayed.

Figure 7:
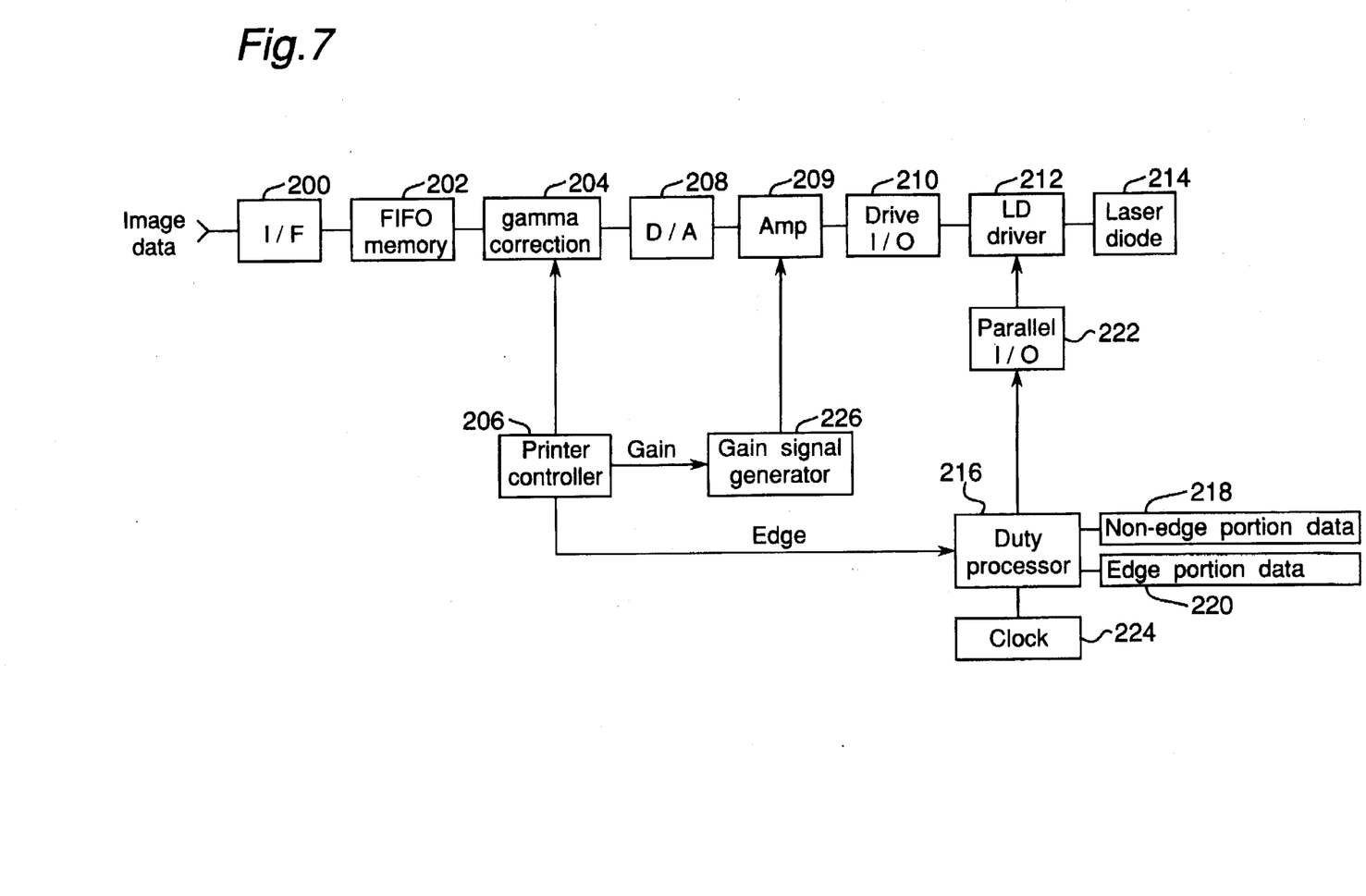
FIG. 7 is a block diagram of an exposure data processing system in a printer.

FIG. 7 is a block diagram of image data processing in the printer 1. The 8-bit image data from the image signal processor 44 is received through an interface 200 by a first-in first-out (FIFO) memory 202. The FIFO memory 202 is a line buffer memory which can store gradation data of image of a prescribed number of lines along the main scan direction, and it is provided to absorb a difference in clock frequencies between the image reader 2 and the printer 1. Next, the data in the FIFO memory 202 is sent to a gamma correction section 204, which performs gamma correction (gradation correction) on the input signal (ID) according to image reproduction characteristics of the photoconductor and the toners by using gamma correction data received from the printer controller 206 in response to the duty ratio. The data after the gamma correction are converted to analog data by a digital-to-analog converter 208 as disclosure data. The disclosure data is converted next by an amplifier 209 with a gain generated by a gain signal generator 226 according to a gain signal set by the printer controller 206, and is sent through a drive input/output circuit 210 to a driver 212 for driving a laser diode 214.

Further, the printer controller 206 sends an edge signal Edge to a duty processor 216. At an edge portion, the duty ratio of light-emitting period is set at 100% to keep resolution high, while at a non-edge portion, the duty ratio is set at a value less than 100%, say 75%, to keep the granularity and gradation high. The duty processor 216 sends a duty signal as an ON/OFF signal in correspondence to a duty data 218 for a dot at a non-edge portion or a duty data 220 for a dot at an edge portion, through a parallel input/output circuit 222 to the driver 212. These duty data 218, 220 are stored in a memory. For example, the duty signal in correspondence to the duty data 220 for a dot at an edge portion has the duty ratio of 100%, while the duty data 218 for a dot at a non-edge portion has the duty ratio of 75% of light-emitting time for a pixel and a period of two pixels. That is, the laser diode 214 is driven for a time in correspondence to 75% of a one-dot period or only when the duty signal is output. The printer controller 206 changes the duty signal according to the edge signal received from the image reader 2. On the other hand, a clock generator 224 sends clock signals of a frequency of four times the modulation frequency through the parallel input/output circuit 222 to the driver 212. Then, the ON/OFF control of the laser diode 214 is turned on or off in the unit of a quarter (25%) of one pixel. Further, the printer controller 206 has a plurality of gradation correction data in correspondence to the duty ratio in order to keep the gradation characteristic constant, and it sends gamma correction data in correspondence to the duty ratio to the gamma correction section 204. Thus, the exposure data is corrected according to the duty ratio. The laser diode 214 driven in the print head 50 exposes the rotating photoconductor 10 with a laser beam to form a latent image thereon.

In the example explained above, the printer controller 206 has a plurality of gradation correction data in correspondence to the duty ratio of 100% and 75% in order to keep the gradation characteristic constant. However, if the precision of gradation correction for a first duty ratio, say 100%, may be lower than that for a second duty ratio, say 75%, only the former may be provided in the printer controller 206 and the latter is calculated by a simplified way. That is, the exposure data is first calculated with the gradation Correction data for the second duty ratio and the obtained data is multiplied with a ratio of 75/100 in order to keep the integrated quantity of light constant.

Figure 8:
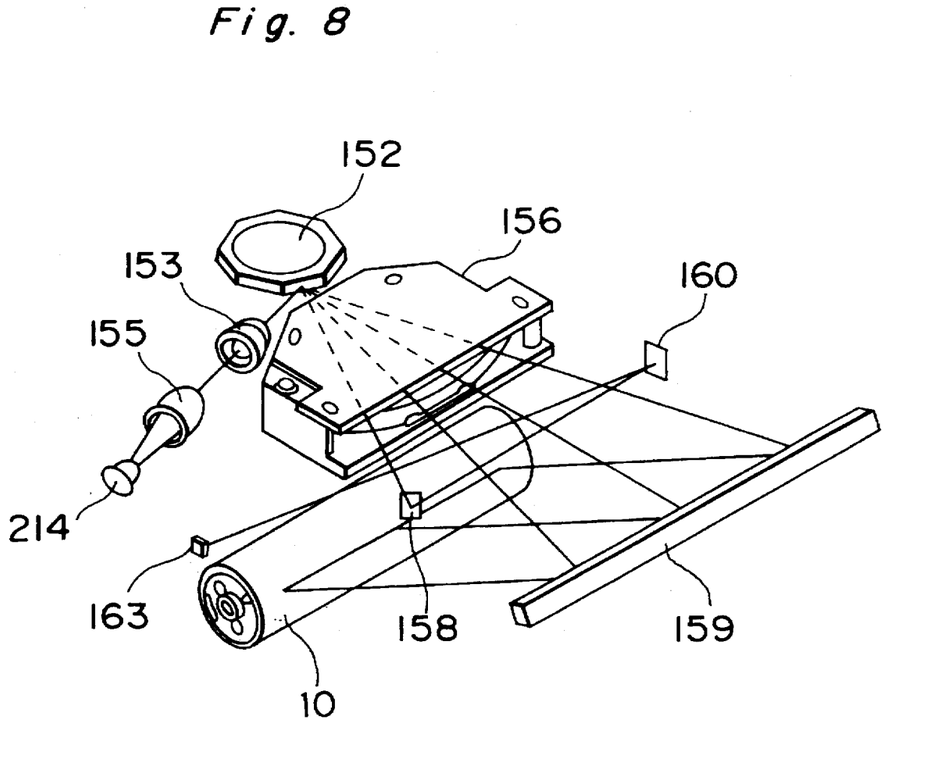
FIG. 8 is perspective view of an optical system in the printer.
Figure 9:
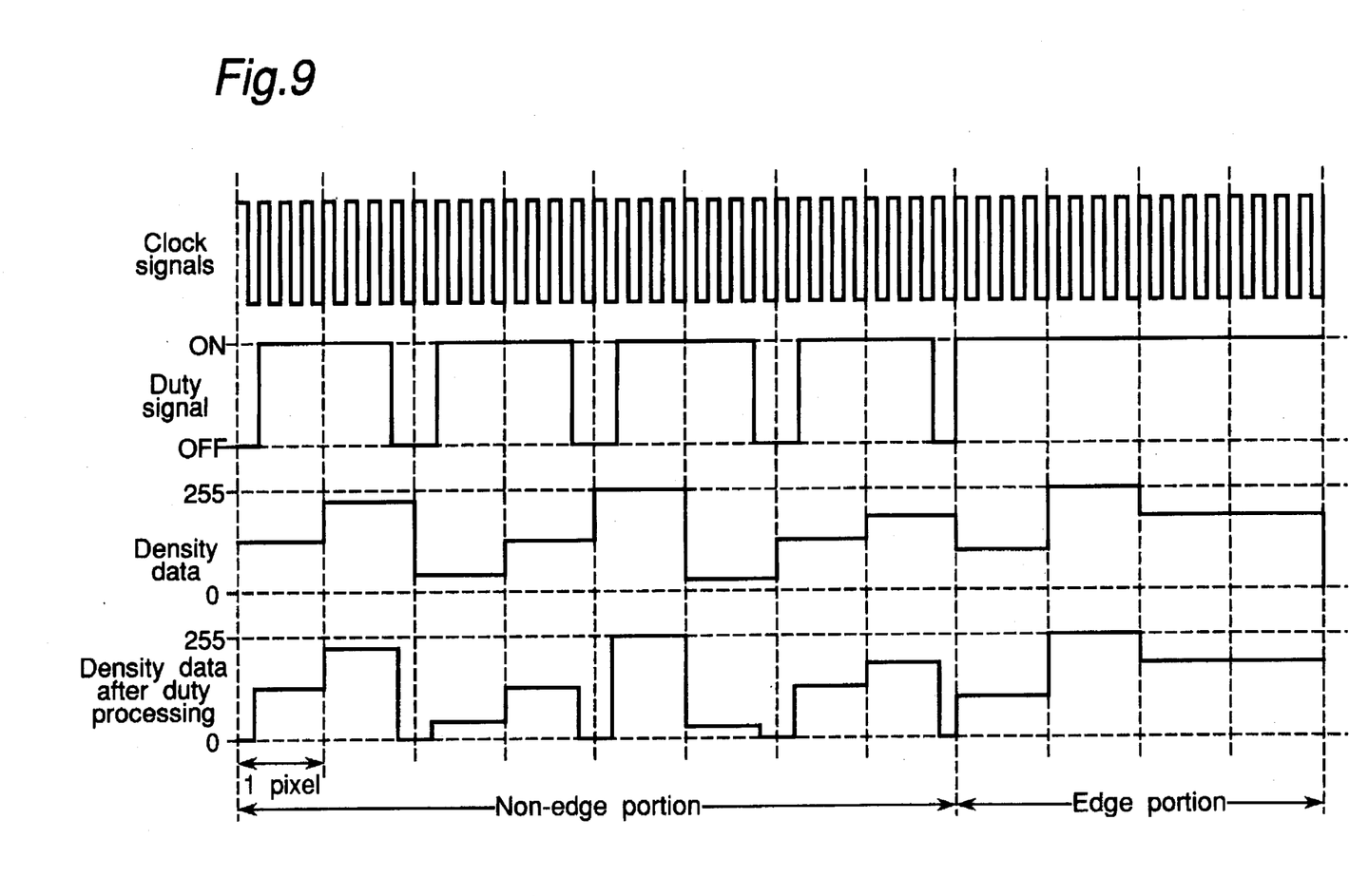
FIG. 9 is a timing chart of duty clocks, duty signal and density data.

FIG. 8 is perspective view of an optical system in the printer 2. A laser beam emitted by the laser diode 214 transmits a collimator lens 155 and a cylindrical lens 153 to be reflected at a plane of a rotating polygon mirror 152. A beam reflected at the plane transmits an f-θ lens 156 and is reflected again by a mirror 159. Then, it passes a slit (not shown) to go out of the optical system to expose the photoconductor drum 10. As the polygon mirror 152 rotates, the direction of the beam changes as shown in FIG. 8, to scan on the photoconductor drum 10 along the axial direction. In order to detect a start of scan for synchronizing the scan along the axial direction, the laser beam is reflected by mirrors 158, 160 to be incident on a photodiode 163. When the photodiode 163 detects a start of scan of a first scan line, a scan of the first scan line is started according to the optical intensity, the duty signal and the clock signals received through the drive input/output circuit 210 and the parallel input/output circuit 222. As shown in FIG. 9, the duty signal is changed between a non-edge portion and an edge portion in the same scan line. Therefore, portions formed with different duty ratios may exist in a reproduced image.

FIG. 9 is an example of a timing chart of duty signal and density data along a scan line where the duty ratio is changed between the non-edge portion and the edge portion. When the photodiode 163 detects a start of scan of a second scan line or the like, a scan of the second scan line or the like is performed similarly. Thus, a latent image is formed in an effective image area on the photoconductor drum 10.

In this example, the duty ratio is set for each pixel with the edge signal. However, generally, an appropriate duty ratio may be set according to an appropriate information on dots in a document.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A digital image forming apparatus where an optical intensity for exposing a photoconductor is modulated for each pixel according to image data, the apparatus comprising:

a light-emitting means for exposing the photoconductor;

a detection means for detecting information on each pixel according to the image data;

a setting means for setting a duty ratio of light emission for each pixel by said light-emitting means according to the information detected by said detection means;

a gamma correction means for correcting a gradation characteristic as a function of said duty ratio;

a controller for controlling light emission of said light-emitting means according to the image data corrected by said correction means and the duty ratio set by said setting mess; and an image reproducing means for reproducing an image on a sheet of paper according to a latent image formed on the photoconductor by said light-emitting means.

2. The apparatus according to claim 1, wherein said detection means detects whether a pixel exists at an edge of an image or not.

3. The apparatus according to claim 2, wherein said setting means sets a duty ratio of 100% for a pixel at an edge and a duty ratio less than 100% for a pixel not existing at an edge.

4. The apparatus according to claim 3, wherein said gamma correction means corrects said gradation characteristic according to a difference between gradation characteristics on a pixel at an edge and on a pixel not existing at an edge caused by a difference in duty ratio.

5. The apparatus according to claim 1, wherein said controller controls an optical intensity of the light emission of said light-emitting means according to the image data and changes an exposure area for each pixel exposed by said light emission means on the photoconductor according to the duty ratio.

6. A digital image forming apparatus where an optical intensity for exposing a photoconductor is modulated for each pixel according to image data for gradation expression, the apparatus comprising:

a light-emitting means for generating a laser beam to expose the photoconductor;

a scan means for scanning the laser beam along a main scan direction;

a detection means for detecting according to the image data whether a pixel exists at an edge of an image or not;

a setting means for setting a duty ratio for each pixel of light emitting time by said light-emitting means at 100% for a pixel at an edge and a value less than 100% for a pixel not existing at an edge;

a gamma correction means for correction a gradation characteristic of the image data according to a difference between gradation characteristics on a pixel at an edge and on a pixel not existing at an edge caused by a difference in duty ratio; and a controller for controlling an optical intensity and a light-emitting time of the laser beam of said light-emitting means according to the image data corrected by said correction means and the duty ratio set by said setting means.

7. The apparatus according to claim 6, wherein said gamma correction means stores a plurality of gamma correction data and selects one of the plurality of gamma correction data according to the duty ratio set by said setting means.

8. The apparatus according to claim 6, wherein said gamma correction means stores a standard gamma correction data and corrects the standard gamma correction data according to the duty ratio set by said setting means.

9. A method for forming an image by scanning a laser beam and modulating an optical intensity of the laser beam for each pixel for gradation expression in an apparatus where the laser beam exposes a photoconductor, the method comprising the steps of:

detecting information on each pixel according to image data;

setting a duty ratio of light emission for each pixel according to the information detected at said detection step;

correcting a gradation characteristic of the image data as a function of said duty ratio; and controlling light emission according to the image data corrected by the gradation characteristic and the duty ratio.

10. The method according to claim 9, wherein in said detection step, it is detected whether a pixel exists at an edge of an image or not.

11. The method according to claim 10, wherein in said setting step, a duty ratio of 100% is set for a pixel at an edge and a duty ratio less than 100% is set for a pixel not existing at an edge.

12. The method according to claim 11, wherein the step of correcting corrects said gradation characteristic according to a difference between gradation characteristics on a pixel at an edge and on a pixel not existing at an edge caused by difference in duty ratio.

13. The method according to claim 9, wherein in said controlling step, an optical intensity of the light emission of said light-emitting means is controlled according to the image data and changes an exposure area for each pixel exposed on the photoconductor according to the duty ratio.

14. A method for forming an image by scanning a laser beam and modulating an optical intensity of the laser beam for each pixel for gradation expression in an apparatus where the laser beam exposes a photoconductor, the method comprising the steps of:

detecting according to the image data whether a pixel exists at an edge of an image or not;

setting a duty ratio for each pixel of light emitting time at 100% for a pixel at an edge and a value less than 100% for a pixel not existing at an edge;

correcting a gradation characteristic of the image data according to a difference between gradation characteristic on a pixel at an edge and on a pixel not existing at an edge caused by a difference in duty ratio; and controlling an optical intensity and a light-emitting time of the laser beam according to the image data corrected on the gradation characteristic and the duty ratio.

15. The method according to claim 14, wherein said apparatus stores a plurality of gamma correction data and in said correction step, one of the plurality of gamma correction data is selected according to the duty ratio.

16. The method according to claim 14, wherein said apparatus stores a standard gamma correction data and in said correction step, the standard gamma correction data is corrected according to the duty ratio.

* * * * *